US012436286B2

(12) United States Patent
Kim et al.

(10) Patent No.: US 12,436,286 B2
(45) Date of Patent: Oct. 7, 2025

(54) LIDAR DEVICE AND METHOD OF OPERATING THE SAME

(71) Applicant: SAMSUNG ELECTRONICS CO., LTD., Suwon-si (KR)

(72) Inventors: Jinmyoung Kim, Hwaseong-si (KR); Kyunghyun Son, Seongnam-si (KR); Dongjae Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1132 days.

(21) Appl. No.: 17/366,886

(22) Filed: Jul. 2, 2021

(65) Prior Publication Data
US 2022/0244385 A1   Aug. 4, 2022

(30) Foreign Application Priority Data
Feb. 3, 2021   (KR) .................. 10-2021-0015654

(51) Int. Cl.
G01S 7/486   (2020.01)
G01S 7/48   (2006.01)
G01S 7/484   (2006.01)
G01S 17/88   (2006.01)
H03M 1/60   (2006.01)

(52) U.S. Cl.
CPC ............ G01S 17/88 (2013.01); G01S 7/4808 (2013.01); G01S 7/484 (2013.01); G01S 7/486 (2013.01); H03M 1/60 (2013.01)

(58) Field of Classification Search
None
See application file for complete search history.

(56) References Cited

U.S. PATENT DOCUMENTS

| 7,612,699 B2 | 11/2009 | Tanizawa |
| 8,421,663 B1 | 4/2013 | Bennett |
| 9,379,731 B1 | 6/2016 | Roham et al. |
| 9,748,963 B2 | 8/2017 | Coban et al. |
| 2013/0321190 A1* | 12/2013 | Lesso .................... H03M 1/186 341/158 |

(Continued)

OTHER PUBLICATIONS

Satoshi et al. "An Automotive LiDAR SoC for 240 × 192-Pixel 225-m-Range Imaging With a 40-Channel 0.0036-mm2 Voltage/Time Dual-Data-Converter-Based AFE", IEEE Journal of Solid-State Circuits, vol. 55, No. 11, Nov. 2020, pp. 2866-2877 (Year: 2020).*

(Continued)

Primary Examiner — Eric L Bolda
(74) Attorney, Agent, or Firm — Sughrue Mion, PLLC

(57) ABSTRACT

A light detection and ranging (LIDAR) device includes: a photodiode configured to generate a current in response to an optical signal being input to the photodiode; a current-voltage conversion circuit configured to convert the current into a voltage; an N-type ring voltage controlled oscillator (RVCO) configured to output a first pulse signal when the voltage is input to the N-type RVCO; a P-type RVCO configured to output a second pulse signal when the voltage is input to the P-type RVCO; and a processor configured to estimate an intensity of the optical signal by identifying, based on the first pulse signal and the second pulse signal, a digital signal value corresponding to the voltage.

15 Claims, 16 Drawing Sheets

(56) References Cited

U.S. PATENT DOCUMENTS

2015/0201137 A1* 7/2015 Lee .................... G01J 3/42
                                                          348/164
2019/0113476 A1* 4/2019 Coln ................ G01N 27/3278
2022/0229164 A1* 7/2022 Steinberg ............. G01S 7/4816

OTHER PUBLICATIONS

Niclass et al., "A 100-m Range 10-Frame/s 340 × 96-Pixel Time-of-Flight Depth Sensor in 0.18-µm CMOS," IEEE Journal of Solid-State Circuits, vol. 48, No. 2, pp. 559-572, Feb. 2013.
Kondo et al., "A 240×192Pixel 10fps 70klux 225m-Range Automotive LiDAR SoC Using a 40ch 0.0036mm$^2$ Voltage/Time Dual-Data-Converter-Based AFE," IEEE, 2020 IEEE International Solid-State Circuits Conference, Session5, Imagers and ToF Sensors, 5.1, Feb. 17, 2020, Total 3 pages.

* cited by examiner

| N-type RVCO | | |
|---|---|---|
| VOLTAGE | FREQUENCY | DIGITAL SIGNAL |
| 0.7V | 25.18MHz | 10.250 |
| 0.701V | 24.04MHz | 11.3125 |
| 0.702V | 22.91MHz | 11.375 |
| 0.703V | 21.79MHz | 12.4375 |
| 0.704V | 20.69MHz | 12.5 |
| 0.705V | 19.60MHz | 13.5 |

(Decision time=500ns)

920

| P-type RVCO | | |
|---|---|---|
| VOLTAGE | FREQUENCY | DIGITAL SIGNAL |
| 0.7V | 51.94MHz | 26.1875 |
| 0.701V | 51.89MHz | 26.125 |
| 0.702V | 51.85MHz | 26.125 |
| 0.703V | 51.80MHz | 26.125 |
| 0.704V | 51.76MHz | 26.0625 |
| 0.705V | 51.71MHz | 26.0625 |

(Decision time=500ns)

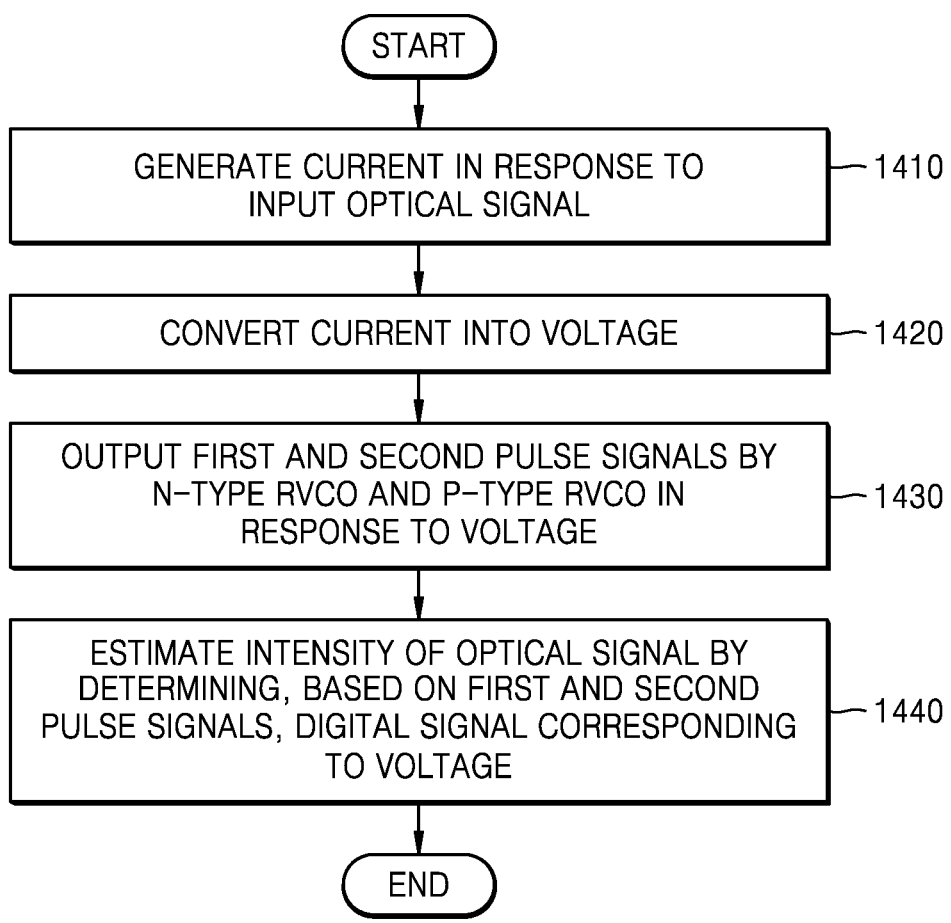

LIDAR DEVICE AND METHOD OF OPERATING THE SAME

CROSS-REFERENCE TO RELATED APPLICATION

This application claims priority from Korean Patent Application No. 10-2021-0015654, filed on Feb. 3, 2021, in the Korean Intellectual Property Office, the disclosure of which is incorporated by reference herein in its entirety.

BACKGROUND

1. Field

Apparatuses and methods consistent with example embodiments relate to a light detection and ranging (LIDAR) device and a method of operating the LIDAR device.

2. Description of the Related Art

Light detection and ranging (LIDAR) systems are used in various fields, for example, aerospace, geology, three-dimensional (3D) maps, automobiles, robots, and drones. LIDAR devices use, as a basic operating principle, a time of flight (ToF) method for measuring the round-trip time of light. For example, a LIDAR device may obtain information about an object using an electric circuit by transmitting light toward the object and receiving light returned from the object through a sensor.

SUMMARY

One or more example embodiments provide light detection and ranging (LIDAR) devices and methods of operating the LIDAR devices.

According to an aspect of an example embodiment, there is provided a light detection and ranging (LIDAR) device including: a photodiode configured to generate a current in response to an optical signal being input to the photodiode; a current-voltage conversion circuit configured to convert the current into a voltage; an N-type ring voltage controlled oscillator (RVCO) configured to output a first pulse signal when the voltage is input to the N-type RVCO; a P-type RVCO configured to output a second pulse signal when the voltage is input to the P-type RVCO; and a processor configured to estimate an intensity of the optical signal by identifying, based on the first pulse signal and the second pulse signal, a digital signal value corresponding to the voltage.

The N-type RVCO and the P-type RVCO may be configured to oscillate at frequencies within different frequency ranges when the voltage varies within a given voltage range.

The N-type RVCO may be further configured to output the first pulse signal which oscillates at a first frequency within a first frequency range when the voltage has a first voltage value within a first voltage range and oscillates at a second frequency within a second frequency range narrower than the first frequency range when the voltage has a second voltage value within a second voltage range different from the first voltage range. The P-type RVCO may be further configured to output the second pulse signal which oscillates at the second frequency within the second frequency range when the voltage has the first voltage value within the first voltage range and oscillates at the first frequency within the first frequency range when the voltage has the second voltage value within the second voltage range.

The processor may be configured to identify the digital signal value corresponding to the voltage based on: at least one of a number of pulses of the first pulse signal and a first piece of phase information on the first pulse signal; and at least one of a number of pulses of the second pulse signal and a second piece of phase information on the second pulse signal.

The LIDAR device may further include: a first counter circuit configured to count a number of pulses of the first pulse signal; and a second counter circuit configured to count a number of pulses of the second pulse signal, wherein the processor may be configured to identify the digital signal value corresponding to the voltage based on the number of pulses of the first pulse signal and the number of pulses of the second pulse signal.

The processor may be configured to identify the digital signal value corresponding to the voltage by calculating a difference between the number of pulses of the first pulse signal and the number of pulses of the second pulse signal. When the number of pulses of the first pulse signal counted for a preset time period is greater than a threshold number, the first counter circuit may be further configured to output a first stop signal for terminating an operation of the N-type RVCO. When the number of pulses of the second pulse signal counted for the preset time period is greater than the threshold number, the second counter circuit may be further configured to output a second stop signal for terminating an operation of the P-type RVCO.

The N-type RVCO may be configured to output the first pulse signal including a plurality of first pulses having different phases from each other, and the P-type RVCO may be configured to output the second pulse signal including a plurality of second pulses having different phases from each other. The processor may be configured to identify the digital signal value corresponding to the voltage based on phase information on the plurality of first pulses and phase information on the plurality of second pulses.

The processor may be configured to: acquire, from the N-type RVCO, a pattern of pulse values of the plurality of first pulses at a predetermined time point; and acquire, from the P-type RVCO, a pattern of pulse values of the plurality of second pulses at the predetermined time point.

The LIDAR device may include an optical receiver including a plurality of pixel regions configured to detect the optical signal, and the optical receiver may include the photodiode, the current-voltage conversion circuit, the N-type RVCO, and the P-type RVCO for each of the plurality of pixel regions.

The LIDAR device may further include a time-to-digital converter (TDC) configured to measure a time of flight of the optical signal based on the voltage.

The LIDAR device may further include a start/stop control circuit connected to the N-type RVCO and the P-type RVCO. The start/stop control circuit may be configured to adjust a frequency resolution for the first pulse signal and the second pulse signal by adjusting a time interval from a first time point when the N-type RVCO and the P-type RVCO start to oscillate to a second time point when the N-type RVCO and the P-type RVCO stop oscillating.

The LIDAR device may further include a peak detection circuit connected to the N-type RVCO and the P-type RVCO and configured to detect a peak of the voltage. The peak detection circuit may be configured to provide the detected peak of the voltage to the N-type RVCO and the P-type RVCO.

According to an aspect of another example embodiment, there is provided an electronic device including a light detection and ranging (LIDAR) device, wherein the LIDAR device may include: an optical transmitter including a light source and configured to irradiate an object with light generated by the light source; an optical receiver configured to detect an optical signal reflected from the object, and a processor configured to acquire information on the object by controlling the optical transmitter and the optical receiver. The optical receiver may include: a photodiode configured to generate a current as the optical signal is input to the photodiode; a current-voltage conversion circuit configured to convert the current into a voltage; an N-type ring voltage controlled oscillator (RVCO) configured to output a first pulse signal when the voltage is input to the N-type RVCO; and a P-type RVCO configured to output a second pulse signal when the voltage is input to the P-type RVCO. The processor may be configured to estimate an intensity of the optical signal by identifying, based on the first pulse signal and the second pulse signal, a digital signal value corresponding to the voltage.

The LIDAR device may further include: a first counter circuit configured to count a number of pulses of the first pulse signal; and a second counter circuit configured to count a number of pulses of the second pulse signal. The processor may be configured to identify the digital signal value based on the number of pulses of the first pulse signal and the number of pulses of the second pulse signal.

The N-type RVCO may be configured to output the first pulse signal including a plurality of first pulses having different phases from each other, and the P-type RVCO may be configured to output the second pulse signal including a plurality of second pulses having different phases from each other. The processor may be configured to identify the digital signal value based on phase information on the plurality of first pulses and phase information on the plurality of second pulses.

According to an aspect of an embodiment, there is provided a light detection and ranging (LIDAR) device including: a photodiode configured to generate a current in response to an optical signal being input to the photodiode; a current-voltage conversion circuit configured to convert the current into a voltage; an N-type delay line configured to output a first delay signal as the voltage is input to the N-type delay line; a P-type delay line configured to output a second delay signal as the voltage is input to the P-type delay line; and a processor configured to estimate an intensity of the optical signal by identifying, based on the first delay signal and the second delay signal, a digital signal value corresponding to the voltage.

The N-type delay line may be configured to output a plurality of first delay signals having different phases from each other, and the P-type delay line may be configured to output a plurality of second delay signals having different phases from each other. The processor may be configured to identify the digital signal value based on phase information on the plurality of first delay signals and phase information on the plurality of second delay signals.

According to an aspect of an embodiment, there is provided a method of operating a light detection and ranging (LIDAR) device, the method including: generating a current by a photodiode in response to an optical signal input to the photodiode; converting the current into a voltage; outputting a first pulse signal and a second pulse signal by an N-type ring voltage controlled oscillator (RVCO) and a P-type RVCO, respectively, to which the voltage is input; and estimating an intensity of the optical signal by identifying, based on the first pulse signal and the second pulse signal, a digital signal value corresponding to the voltage.

The estimating of the intensity of the optical signal may include identifying the digital signal value based on: at least one of a number of pulses of the first pulse signal and a first piece of phase information on the first pulse signal; and at least one of a number of pulses of the second pulse signal and a second piece of phase information on the second pulse signal.

BRIEF DESCRIPTION OF THE DRAWINGS

The above and/or other aspects will be more apparent by describing certain example embodiments, with reference to the accompanying drawings, in which:

FIG. 9 is a view illustrating example tables showing a correspondence relationship between inputs and outputs of each of the N-type RVCO and the P-type RVCO, according to an embodiment;

FIG. 14 is a flowchart illustrating a method of operating a LIDAR device according to an embodiment.

DETAILED DESCRIPTION

Figure 1:
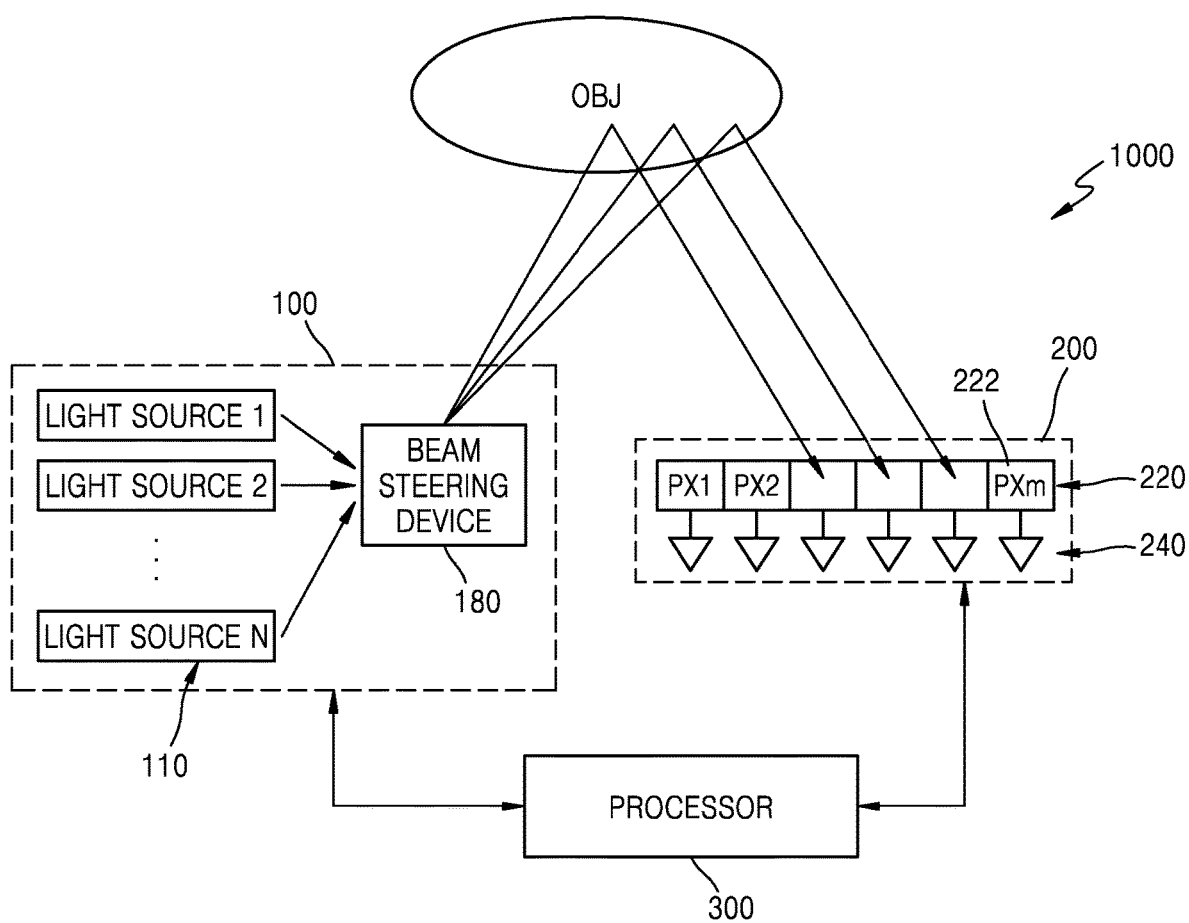
FIG. 1 is a view illustrating basic operations of a LIDAR device according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The terms used in the present disclosure are selected based on general terms currently widely used in the art in consideration of functions regarding the present disclosure, but the terms may vary according to the intention of those of ordinary skill in the art, precedents, or new technology in the art. Also, some terms may be arbitrarily selected, and in this case, the meaning of the selected terms will be described in the detailed description of the present disclosure. Thus, the terms used herein should not be construed based on only the names of the terms but should be construed based on the meaning of the terms together with the description throughout the present disclosure.

In the following descriptions of embodiments, when an element is referred to as being "above" or "on" another element, it may be directly on an upper, lower, left, or right side of the other element while making contact with the other element or may be above an upper, lower, left, or right side of the other element without making contact with the other element. The terms of a singular form may include plural forms unless otherwise mentioned.

In the following descriptions of embodiments, when a portion or element is referred to as being connected to another portion or element, the portion or element may be directly connected to the other portion or element, or may be electrically connected to the other portion or element with intervening portions or elements being therebetween.

In the following descriptions of the embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

In addition, although terms such as "first" and "second" are used to describe various elements, these elements should not be limited by these terms. These terms are only used to distinguish one element from other elements.

In the descriptions of light detection and ranging (LIDAR) devices according to embodiments, those well-known to those of ordinary skill in the art will not be described in detail.

The following descriptions of the embodiments should not be construed as limiting the scope of the present disclosure, and modifications or changes that could be easily made from the embodiments by those of ordinary skill in the art should be construed as being included in the scope of the present disclosure. Hereinafter, embodiments will be described with reference to the accompanying drawings.

FIG. 1 is a view illustrating basic operations of a LIDAR device 1000 according to an embodiment.

Referring to FIG. 1, the LIDAR device 1000 may include an optical transmitter 100, an optical receiver 200, and a processor 300. FIG. 1 shows elements of the LIDAR device 1000 which are related to only the present embodiment. Therefore, it may be obvious to those of ordinary skill y in the art that the LIDAR device 1000 may further include other general-purpose elements in addition to the elements shown in FIG. 1.

The optical transmitter 100 may emit light toward an object OBJ. The optical transmitter 100 may include a light source unit 110 including one or more light sources (such as a light source 1, a light source 2, . . . , and a light source N) and a beam steering device 180.

In an embodiment, the light source unit 110 and the beam steering device 180 may be arranged and operated such that the object OBJ may be scanned at different scanning angles with light emitted from the light sources and passing through the beam steering device 180. In another embodiment, the light source unit 110 and the beam steering device 180 may be arranged and operated such that the object OBJ may be scanned at the same scanning angle with light emitted from the light sources and passing through the beam steering device 180.

The light sources of the light source unit 110 may emit light to be used for analyzing the location, shape, and material of the object OBJ. The light source unit 110 may generate and output light having a predetermined wavelength, and for example, the light source unit 110 may emit light in a wavelength band such as an infrared band suitable for analyzing the location, shape, and material of the object OBJ. When infrared light is used, it may be possible to prevent the infrared light from mixing with visible natural light such as sunlight. However, the infrared light is a non-limiting example, and the light source unit 110 may emit light in various wavelength bands.

The light source unit 110 may include light sources such as a laser diode (LD), an edge emitting laser, a vertical-cavity surface emitting laser (VCSEL), a distributed feedback laser, a light emitting diode (LED), or a super luminescent diode (SLD). The light source unit 110 may generate and output light in a plurality of wavelength bands. The light source unit 110 may generate and output pulsed or continuous light.

The light sources may emit light toward the object OBJ under the control of the processor 300. For example, the processor 300 may set the direction or scanning angle of light emitted from each of the light sources and may control the light source unit 110 such that each of the light sources may emit light according to the set direction or scanning angle.

The beam steering device 180 may steer light emitted from the light source unit 110 toward the object OBJ, and the steering direction may be time-sequentially adjusted such that the entire area of the object OBJ may be scanned with point light emitted from the light source unit 110. A scanning mirror (SM) or an optical phased array (OPA) may be used as the beam steering device 180.

The optical receiver 200 may detect an optical signal reflected from the object OBJ. The optical receiver 200 may include a plurality of pixel regions 222, and an optical signal reflected from the object OBJ may be detected in each of the pixel regions 222.

As shown in FIG. 1, the optical receiver 200 may include a detector array 220 divided into the pixel regions 222 (PX1, PX2, . . . ). Photodiodes may be respectively arranged in the pixel regions 222. In other words, the photodiodes may respectively form the pixel regions 222 which are distinguishable according to the positions thereof within the detector array 220, and the pixel regions 222 may detect optical signals reflected from the object OBJ, distinguishably according to light emitted from the light sources of the light source unit 110. The optical receiver 200 may further include an optical element for collecting light from the object OBJ in the pixel regions 222.

The optical receiver 200 may include a circuit unit 240 configured to measure the time of flight (ToF) or the intensity of each of optical signals respectively detected by the photodiodes. The circuit unit 240 may include an analog-to-digital converter (ADC) and/or a time-to-digital converter (TDC). The intensity of optical signals may be used to obtain information about the material of the object OBJ. For example, even when optical signals have the same ToF, the optical signals may have different degrees of intensity according to the material of the object OBJ. When the object OBJ includes a metal having relatively high reflectance, the intensity of an optical signal reflected from the object OBJ may be relatively high, and when the object OBJ includes a wood having high surface roughness and thus relatively low reflectance, the intensity of an optical signal reflected from the object OBJ may be relatively low.

In general, the ToF of an optical signal may be more acutely detected with a simpler circuit structure by a method using a TDC than by a method using an ADC, but it may be more difficult to detect the intensity of optical signals by a method using a TDC than by a method using an ADC. A method using a general ADC is used to detect the intensity of optical signals as well as the ToFs of the optical signals. However, a method of acquiring a ToF using only an ADC may make it difficult to design the optical receiver 200 because a high-frequency (several gigasample-per-second (GSPS) or more), expensive, large-area ADC is required to obtain the entire waveform of a detected optical signal.

The circuit unit 240 may be configured to measure the ToF of an optical signal using a TDC and measure the intensity of the optical signal using an ADC. Since the circuit unit 240 is configured to obtain separate pieces of information using the TDC and the ADC, the optical receiver 200 may be provided using a low-frequency, inexpensive, and small-area ADC. The ADC may include an N-type ring voltage controlled oscillator (RVCO) and a P-type RVCO. Herein, a low frequency may refer to a frequency lower than several Ghz, and may be, for example, within the range of about 10 Mhz to about 80 Mhz.

The photodiodes, which are sensors capable of sensing light, may be, for example, light-receiving devices capable of generating electrical signals in response to optical energy. The light-receiving devices are not limited to a specific type.

In an embodiment, the LIDAR device 1000 may use a point scanning method as described above, and thus, the intensity of light incident on the photodiodes may be relatively low compared to the case of using another method such as a flash method. Examples of the photodiodes may include an avalanche photodiode (APD) and a single photon avalanche diode (SPAD) which have high sensing sensitivity.

The processor 300 may obtain information about the object OBJ by controlling the optical transmitter 100 and the optical receiver 200. The processor 300 may perform a signal processing process to obtain information about the object OBJ by using light detected by the optical receiver 200. For example, the processor 300 may determine the distance to each location of the object OBJ based on the ToFs of optical signals reflected from the object OBJ, and may perform a data processing process for analyzing the locations and the shape of the object OBJ. The processor 300 may detect the material of the object OBJ based on the intensity of an optical signal reflected from the object OBJ, and may perform a data processing process for analyzing the shape of the object OBJ.

Information analyzed by the processor 300, that is, information on the shape and/or location and/or material of the object OBJ may be transmitted to other units for use in the other units. For example, such information may be transmitted to a processor of an autonomous driving device such as an unmanned vehicle or a drone which employs the LIDAR device 1000. In addition, such information may be used in smartphones, cellular phones, personal digital assistants (PDAs), laptops, PCs, various wearable devices, or other mobile or non-mobile computing devices.

The processor 300 may control the overall operation of the LIDAR device 1000. The processor 300 may divide the area of the object OBJ into a plurality of regions by considering the number of light sources of the light source unit 110, and may generate a control signal and transmit the control signal to the beam steering device 180 such that all the regions of the object OBJ may be scanned with the beam steering device 180.

The processor 300 may control the operation of the light source unit 110 of the optical transmitter 100 and the operation of the optical receiver 200. For example, the processor 300 may perform power supply control, on/off control, pulse wave (PW) or continuous wave (CW) generation control, and the like for the light source unit 110. In addition, the processor 300 may apply a control signal to each of the photodiodes of the optical receiver 200.

The LIDAR device 1000 may include a memory in which programs and other data are stored for operations of the processor 300.

For example, the memory, which is hardware for storing various types of process data in the LIDAR device 1000, may store data processed by the LIDAR device 1000 and data to be processed by the LIDAR device 1000. In addition, the memory may store applications, drivers, etc. to be executed by the LIDAR device 1000.

Examples of the memory may include a random access memory (RAM), such as a dynamic random access memory (DRAM) and a static random access memory (SRAM), a read-only memory (ROM), an electrically erasable programmable read-only memory (EEPROM), CD-ROM, a Blu-ray disc, another optical disk storage, a hard disk drive (HDD), a solid state drive (SSD), and a flash memory, and in addition, examples of the memory may include an external storage device accessible to the LIDAR device 1000.

Figure 2:
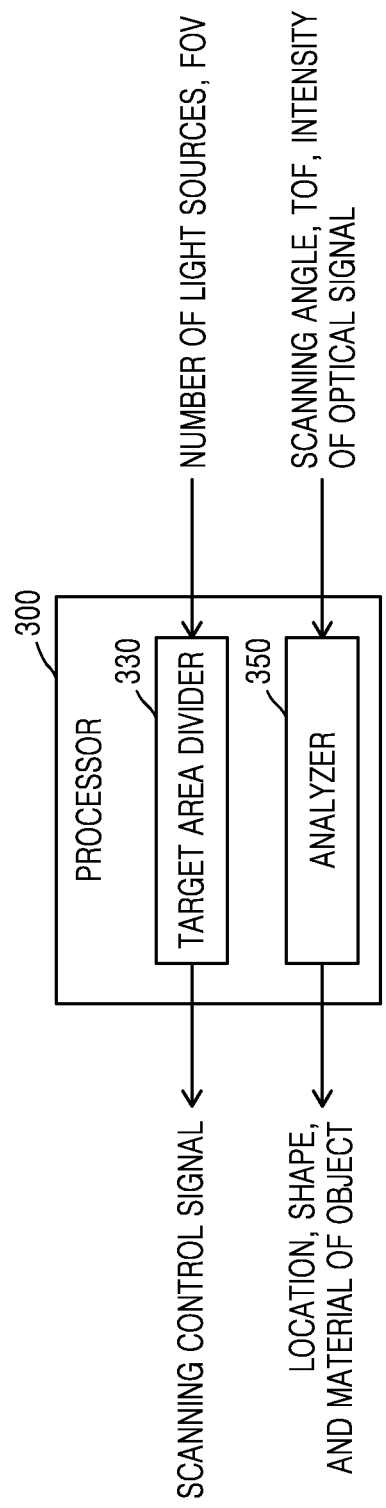
FIG. 2 is a block diagram illustrating an example configuration of a processor included in the LIDAR device according to an embodiment.
Figure 3:
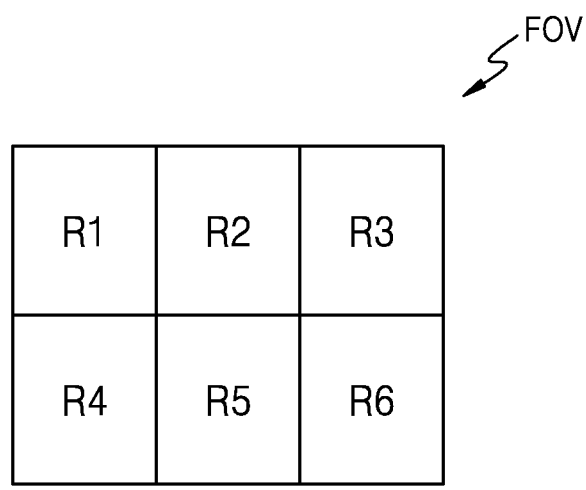
FIG. 3 is a view illustrating an example in which the processor shown in FIG. 2 divides a target area.

FIG. 2 is a block diagram illustrating an example configuration of the processor 300 included in the LIDAR device 1000 according to an embodiment, and FIG. 3 is a view illustrating an example in which the processor 300 shown in FIG. 2 divides a target area.

Referring to FIGS. 2 and 3, the processor 300 may include a target area divider 330 and an analyzer 350. Codes for operating the target area divider 330 and the analyzer 350 may be stored in the memory of the LIDAR device 1000, and the processor 300 may execute the codes.

The target area divider 330 may divide a field of view (FOV) including the object OBJ into as many regions as the number of light sources of the LIDAR device 1000. FIG. 3 shows an example in which the FOV is divided into six regions when the number of light sources is six. However, this is merely a non-limiting example, and the number of regions or the shapes of regions are not limited thereto.

The target area divider 330 may generate a scanning control signal for scanning the regions with the optical transmitter 100 and may transmit the scanning control signal to the optical transmitter 100. For example, when the beam steering device 180 is an SM, the scanning control signal may be a rotation control signal for controlling the rotation direction and angle of the SM.

When the beam steering device 180 is an OPA, the scanning control signal may be a phase control signal to be applied to each channel. The phase control signal may be an electrical signal to be applied to meta-device which forms each channel, or a phase delay signal for a phase retarder provided in each channel.

The analyzer 350 may analyze the location, shape, and material of the object OBJ by considering information such as the scanning angle of light emitted to the object OBJ, and/or a ToF calculated in consideration of the scanning angle of light, and/or the intensity of light reflected from the object OBJ.

Figure 4:
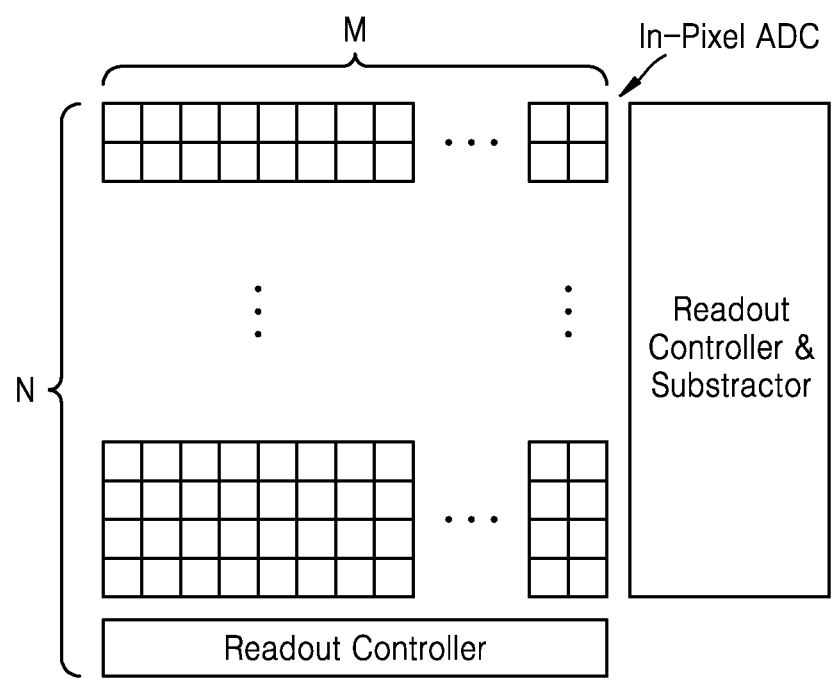
FIG. 4 is a view illustrating a plurality of pixel regions of an optical receiver according to an embodiment.

FIG. 4 is a view illustrating a plurality of pixel regions of the optical receiver 200 according to an embodiment. In FIG. 1, the optical receiver 200 is illustrated as having a one-dimensional (1D) arrangement, but referring to FIG. 4, the optical receiver 200 may have a two-dimensional (2D) arrangement in which a plurality of pixel regions are arranged as a 2D array to expand the field of view (FOV).

A general ADC implementation method requires a high frequency to obtain a ToF, and since high-frequency ADCs are expensive and have a large area, there may be limitations in providing ADCs respectively in pixel regions. However, according to the present disclosure, the ToF of an optical signal is obtained using a TDC, and the intensity of the optical signal is obtained using a low-frequency ADC, such that an inexpensive, small-area ADC may be provided in each pixel region. Since an ADC is provided in each pixel region, information about the intensity of each optical signal input to each pixel region may be accurately obtained.

Figure 5:
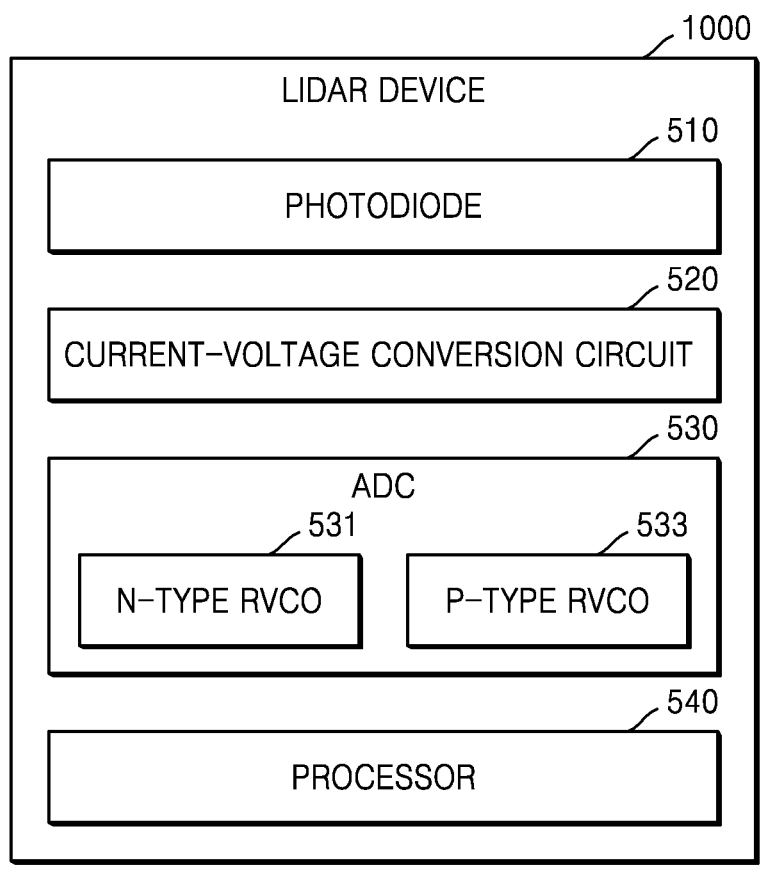
FIG. 5 is a block diagram illustrating a LIDAR device according to an embodiment.

FIG. 5 is a block diagram illustrating a LIDAR device 1000 according to an embodiment. Referring to FIG. 5, the LIDAR device 1000 may include a photodiode 510, a current-voltage conversion circuit 520, an ADC 530, and a processor 540. The photodiode 510, the ADC 530, and the processor 540 shown in FIG. 5 may correspond to the photodiodes, the ADCs, and the processor 300 described with reference to FIGS. 1 to 4.

FIG. 5 shows elements of the LIDAR device 1000 which are related to only the present embodiment. Therefore, it may be obvious to those of ordinary skill in the art that the LIDAR device 1000 may further include other general-purpose elements in addition to the elements shown in FIG. 5.

The photodiode 510 may generate a current in response to an optical signal input to the photodiode 510. For example, when a strong optical signal is input to the photodiode 510, the photodiode 510 may generate a current corresponding to the strong optical signal, and when a weak optical signal is input to the photodiode 510, the photodiode 510 may generate a current corresponding to the weak optical signal.

The current-voltage conversion circuit 520 may convert the current output from the photodiode 510 into a voltage. Since the photodiode 510 converts an optical signal into a current and the current-voltage conversion circuit 520 converts the current into a voltage, the voltage output from the current-voltage conversion circuit 520 may have a magnitude corresponding to the intensity of the optical signal.

The ADC 530 may receive the voltage from the current-voltage conversion circuit 520 and may output a pulse signal corresponding to the voltage. For example, the ADC 530 may include an N-type RVCO 531 and a P-type RVCO 533. The N-type RVCO 531 may output a first pulse signal when a voltage V1 is input to the N-type RVCO, and the P-type RVCO 533 may output a second pulse signal when the voltage V1 is input to the P-type RVCO 533.

The N-type RVCO 531 and the P-type RVCO 533 may oscillate at different frequencies when the same voltage is input thereto. For example, the first pulse signal and the second pulse signal may have different frequencies.

The processor 540 may estimate the intensity of the optical signal by determining, based on the first pulse signal and the second pulse signal, a digital signal or a digital signal value corresponding to the voltage v1. For example, the processor 540 may determine the digital signal as D1 or D2. When the digital signal is D1, the processor 540 may estimate that the intensity of the optical signal is L1, and when the digital signal is D2, the processor 540 may estimate that the intensity of the optical signal is L2 which is greater than L1.

The LIDAR device 1000 may include an optical receiver (for example, the optical receiver 200 shown in FIG. 1) which includes a plurality of pixel regions (for example, the pixel regions 222 shown in FIG. 1) as described above with reference to FIGS. 1 and 4. The optical receiver 200 may include the photodiode 510, the current-voltage conversion circuit 520, and the ADC 530 in each of the pixel regions (for example, the pixel regions 222 shown in FIG. 1). Since the LIDAR device 1000 includes the photodiode 510 and a circuit corresponding to the photodiode 510 in each of the pixel regions (for example, the pixel regions 222 shown in FIG. 1), the LIDAR device 1000 may obtain information about an optical signal input to the photodiode 510 independently in each of the pixel regions (for example, the pixel regions 222 shown in FIG. 1).

When a single ADC 530 is connected to a plurality of photodiodes 510, optical signal detection sensitivity may be low due to a decrease in bandwidth. Photodiodes 510 are provided respectively in the pixel regions (for example, the pixel regions 222 shown in FIG. 1), and corresponding ADCs 530 are provided respectively for the photodiodes 510, thereby guaranteeing high sensitivity in detecting optical signals compared to the case in which a single ADC 530 is connected to a plurality of photodiodes 510.

The processor 540 may determine a digital signal using different oscillation characteristics of the N-type RVCO 531 and the P-type RVCO 533. For example, the processor 540 may determine a digital signal based on: the number of pulses of the first pulse signal and/or a first piece of phase information on the first pulse signal; and the number of pulses of the second pulse signal and/or a second piece of phase information on the second pulse signal. Each of the first pulse signal and the second pulse signal may be a signal oscillating at a unique frequency. Signals oscillating at unique frequencies may have different numbers of pulses for a given period of time, or may have different phase information according to time. The processor 540 may determine a digital signal by combining values about different oscillation characteristics of the N-type RVCO 531 and the P-type RVCO 533.

The N-type RVCO 531 and the P-type RVCO 533 may oscillate at frequencies within different frequency ranges when voltages varying within the same voltage range is input to the N-type RVCO 531 and the P-type RVCO 533. For example, the N-type RVCO 531 and the P-type RVCO 533 may have frequency variations complementary to each other within the same voltage range.

Figure 6A:
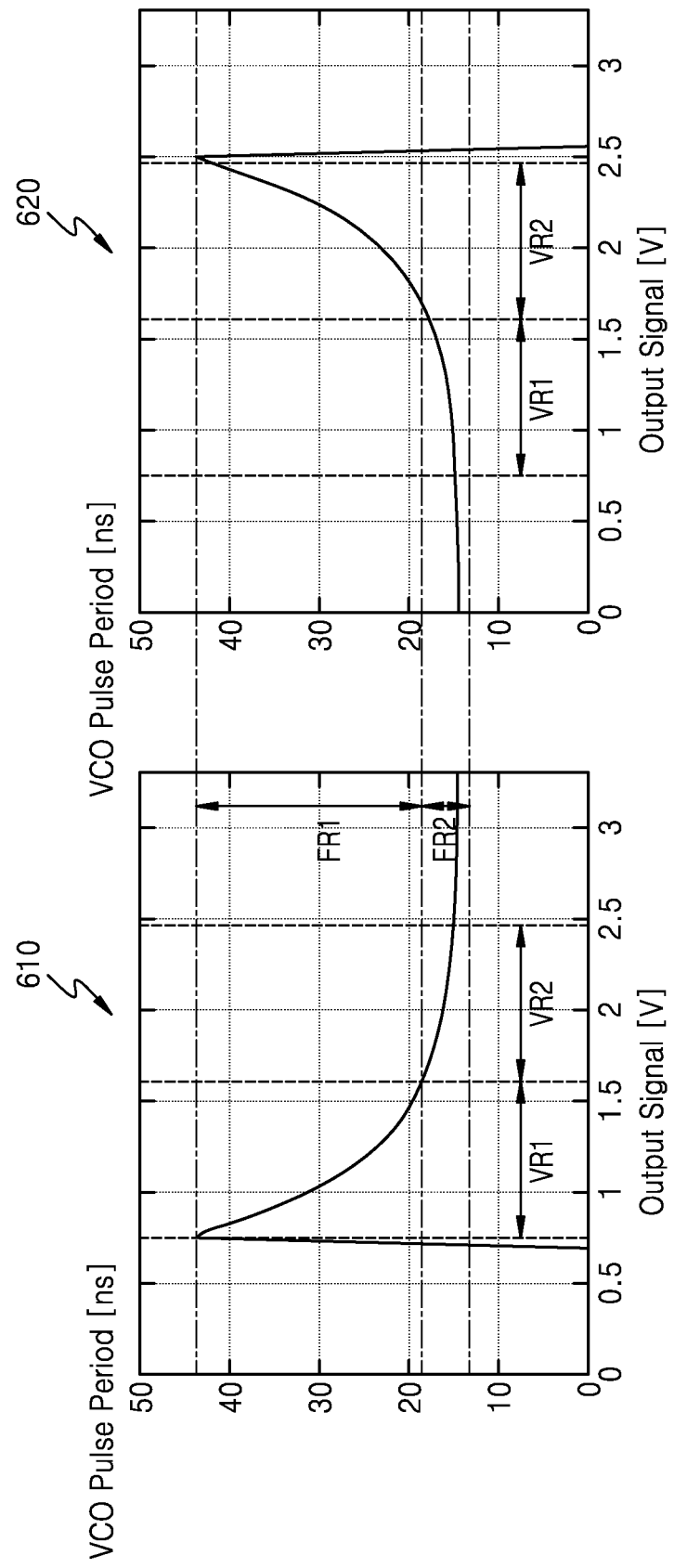
FIG. 6A is view illustrating example graphs of outputs of different types of ring voltage controlled oscillators (RVCOs) according to an embodiment.

FIG. 6A is a view illustrating example graphs of outputs of different types of RVCOs according to an embodiment. In each graph, the y-axis refers to a period, and because it is obvious to a person skilled in the art that the reciprocal of the period is the frequency, the following description will be given on the premise that a large variation in period may correspond to a large variation in frequency.

Referring to FIG. 6A, it may be understood that a first graph 610 showing a relationship between a voltage applied to the N-type RVCO 531 and a frequency output from the N-type RVCO 531 is complementary to a second graph 620 showing a relationship between a voltage applied to the P-type RVCO 533 and a frequency output from the P-type RVCO 533.

When voltages applied to the N-type RVCO 531 and the P-type RVCO 533 vary within the same voltage range, the N-type RVCO 531 and the P-type RVCO 533 may oscillate at frequencies within different frequency ranges. For example, when a voltage varying within a first voltage range VR1 of about 0.7 V to about 1.6 V is input to each of the N-type RVCO 531 and the P-type RVCO 533, the output frequency of the N-type RVCO 531 may vary within a first frequency range FR1 in which the period of pulses ranges from about 18 ns to about 45 ns, and the output frequency of the P-type RVCO 533 may vary within a second frequency range FR2 in which the period of pulses ranges from about 14 ns to about 18 ns.

For example, when a voltage varying within a second voltage range VR2 of about 1.6 V to about 2.4 V is input to each of the N-type RVCO 531 and the P-type RVCO 533, the output frequency of the N-type RVCO 531 may vary within the second frequency range FR2 in which the period of pulses ranges from about 14 ns to about 18 ns, and the output frequency of the P-type RVCO 533 may vary within the first frequency range FR1 in which the period of pulses ranges from about 18 ns to about 45 ns.

Each of the N-type RVCO 531 and the P-type RVCO 533 may have a region in which the variation amount or variation rate of the frequency is relatively great with respect to a voltage range. In a region in which the variation amount or variation rate of the frequency is relatively great, the N-type RVCO 531 or the P-type RVCO 533 oscillates with a large frequency variation in response to even a slight variation in the voltage applied to the N-type RVCO 531 or the P-type RVCO 533, and thus the processor 540 may clearly detect the slight variation in the voltage.

For example, when a voltage within the first voltage range VR1 is input to the N-type RVCO 531, the N-type RVCO 531 may output a first pulse signal oscillating at a frequency within the first frequency range FR1, and when a voltage within the second voltage range VR2 different from the first voltage range VR1 is input to the N-type RVCO 531, the N-type RVCO 531 may output a first pulse signal oscillating at a frequency within the second frequency range FR2 which is narrower than the first frequency range FR1.

The voltage-frequency relationship of the P-type RVCO 533 may be the opposite of the voltage-frequency relationship of the N-type RVCO 531. For example, when a voltage within the first voltage range VR1 is input to the P-type RVCO 533, the P-type RVCO 533 may output a second pulse signal oscillating at a frequency within the second frequency range FR2 which is narrower than the first frequency range FR1, and when a voltage within the second voltage range VR2 is applied to the P-type RVCO 533, the P-type RVCO 533 may output a second pulse signal oscillating at a frequency within the first frequency range FR1.

The processor 540 may detect the magnitude of an input voltage using a single type of RVCO. For example, when a voltage of about 0.7 V is input to the N-type RVCO 531, a first pulse signal having a period of about 45 ns may be output, and when a voltage of about 1 V is input to the N-type RVCO 531, a first pulse signal having a period of about 30 ns may be output. The processor 540 may distinguish the voltage of 0.7 V and the voltage of 1 V by using a difference of 45 ns−30 ns=15 ns.

In addition, when a voltage of about 2.2 V is input to the N-type RVCO 531, a first pulse signal having a period of about 16 ns may be output, and even when a voltage of about 2.4 V is input to the N-type RVCO 531, a first pulse signal having a period of about 16 ns may be output. In this case, it may be difficult for the processor 540 to distinguish the voltage of 2.2 V and the voltage of 2.4 V from each other. Since the N-type RVCO 531 and the P-type RVCO 533 have complementary frequency variation characteristics, a voltage range that is difficult to detect using one RVCO (for example, the N-type RVCO 531) may be easily detected using another RVCO (for example, the P-type RVCO 533).

The processor 540 may detect a voltage within a wide voltage range (for example, ranging from about 0.7 V to about 2.4 V) by using pulse signals output from both the N-type RVCO 531 and the P-type RVCO 533.

Figure 6B:
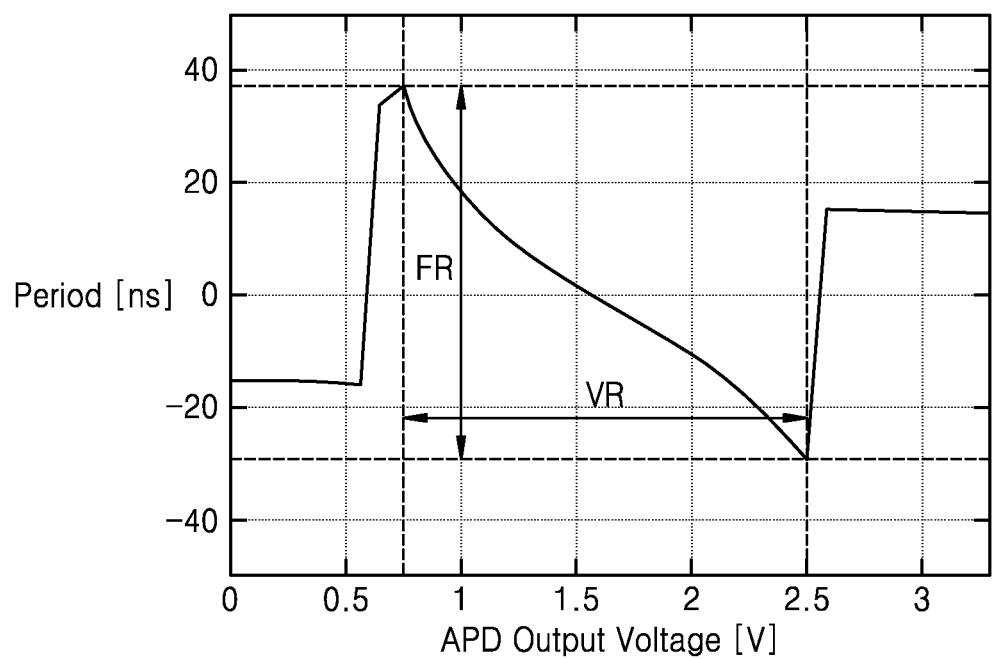
FIG. 6B is an example graph illustrating the difference between the outputs of the different types of RVCOs according to an embodiment.

FIG. 6B is an example graph illustrating the difference between outputs of different types of RVCO (for example, the N-type RVCO 531 and the P-type RVCO 533) according to an embodiment. Referring to FIG. 6B, the outputs of the N-type RVCO 531 and the P-type RVCO 533 which are of different types are used. Therefore, a voltage range VR in which voltages are easily distinguishable ranges from about 0.7 V to about 2.4 V and is wider than the ranges shown in FIG. 6A (the voltage range VR1 in the first graph 610 and the voltage range VR2 in the second graph 620) in which voltages are easily distinguishable.

For example, in the first graph 610, the first frequency range FR1 corresponding to the first voltage range VR1 may allow easy distinguishment of voltages owing to a large frequency variation, but the second frequency range FR2 corresponding to the second voltage range VR2 may result in difficulty in distinguishment of voltages because of a small frequency variation. In the graph shown in FIG. 6B, the variation of frequency is large in a frequency range FR corresponding to the voltage range VR which is wider than the first voltage range VR1, and thus voltages may be uniformly distinguished in the entirety of the voltage range VR. In other words, the processor 540 may distinguish voltages with high resolution within a wide voltage range by using pulse signals oscillating at different frequencies in response to the same input voltage.

Figure 7:
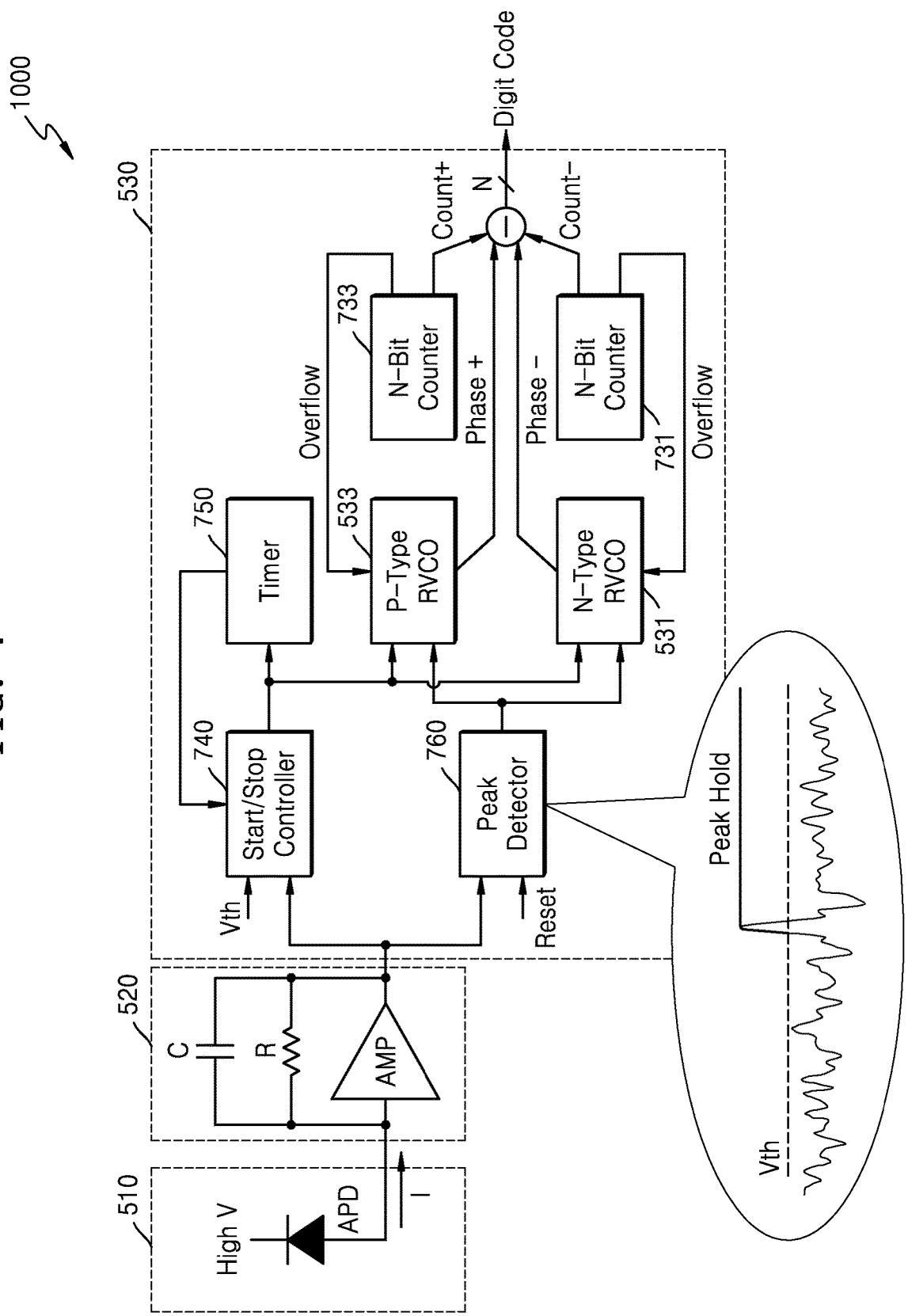
FIG. 7 is a circuit diagram illustrating a LIDAR device according to an embodiment.

FIG. 7 is a circuit diagram illustrating a LIDAR device 1000 according to an embodiment. Referring to FIG. 7, the LIDAR device 1000 may include a photodiode 510, a current-voltage conversion circuit 520, and an ADC 530.

The ADC 530 may further include a first counter circuit 731 configured to count the number of pulses of a first pulse signal output from an N-type RVCO 531. The ADC 530 may further include a second counter circuit 733 configured to count the number of pulses of a second pulse signal output from a P-type RVCO 533. The first counter circuit 731 may count the number of pulses of the first pulse signal during the time the N-type RVCO 531 operates. The second counter circuit 733 may count the number of pulses of the second pulse signal during the time the P-type RVCO 533 operates.

The processor 540 (refer to FIG. 5) may acquire the counted number of pulses of the first pulse signal and the counted number of pulses of the second pulse signal. The processor 540 may determine a digital signal based on the acquired number of pulses of the first pulse signal and the acquired number of pulses of the second pulse signal. For example, the processor 540 may determine a digital signal by calculating the difference between the number of pulses of the first pulse signal and the number of pulses of the second pulse signal.

When a voltage V1 is input to each of the N-type RVCO 531 and the P-type RVCO 533, the number of pulses of the first pulse signal may be 10 and the number of pulses of the second pulse signal may be 26. When the voltage V1 is input to each of the N-type RVCO 531 and the P-type RVCO 533, the processor 540 may determine a digital signal indicating 16 by calculating the difference of 26−10=16. When a voltage V2 is input to each of the N-type RVCO 531 and the P-type RVCO 533, the number of pulses of the first pulse signal may be 11 and the number of pulses of the second pulse signal may be 26. When the voltage V2 is input to each of the N-type RVCO 531 and the P-type RVCO 533, the processor 540 may determine a digital signal indicating 15 by calculating the difference of 26−11=15.

The processor 540 may estimate the intensity of an optical signal based on that the digital signal indicating 16 corresponds to the voltage V1, and the digital signal indicating 15 corresponds to the voltage V2. The correspondence relationship between voltages and digital signals may be pre-calculated experimentally, mathematically, or empirically, and may be stored in a memory of the LIDAR device 1000. The processor 540 may estimate the intensity of an optical signal by referring to the correspondence relationship between voltages and digital signals which is stored in the memory.

When an overflow occurs, the first counter circuit 731 and the second counter circuit 733 may output an overflow signal to terminate the operation of one of the N-type RVCO 531 and the P-type RVCO 533 such that the other one of the N-type RVCO 531 and the P-type RVCO 533 may be controlled to output a pulse signal. When an overflow occurs because the number of pulses exceeds the number calculable by the first and second counter circuits 731 and 733, the number of pulses calculated by the first and second counter circuits 731 and 733 may be different from the actual number of pulses. When a digital signal is determined based on a pulse number different from the actual number of pulses, information distortion may occur. Therefore, the first counter circuit 731 may stop the operation of the N-type RVCO 531 when an overflow occurs, and the processor 540 may determine a digital signal based on the number of pulses output from the P-type RVCO 533.

An overflow may be a situation in which more pulses are counted for the same period of time and may thus mean that a corresponding RVCO oscillates at a relatively high frequency. The high frequency corresponds to a short period and may, for example, correspond to the second frequency range FR2 shown in FIG. 6A. As described above with reference to FIG. 6A, the second frequency range FR2 has a small frequency variation and may thus make it difficult to distinguish voltages. The processor 540 does not use a pulse signal corresponding to the second frequency range FR2 which makes it difficult to distinguish voltages due to a small frequency variation, but may use only the other pulse signal for distinguishing voltages.

For example, when an overflow occurs at the first counter circuit 731, the first counter circuit 731 may stop the operation of the N-type RVCO 531 which outputs a first pulse signal with which it is difficult to distinguish voltages, and thus a digital signal may be determined based on a second pulse signal which is output from the P-type RVCO 533 and with which it is easy to distinguish voltages.

For example, when an overflow occurs at the second counter circuit 733, the second counter circuit 733 may stop the operation of the P-type RVCO 533 which outputs a second pulse signal with which it is difficult to distinguish voltages, and thus a digital signal may be determined based on a first pulse signal which is output from the N-type RVCO 531 and with which it is easy to distinguish voltages.

For illustrative purposes only, it has been described that a pulse signal corresponding to the second frequency range FR2 shown in FIG. 6A may cause an overflow in the first and second counter circuits 731 and 733, but the range in which an overflow may occur is not limited thereto. An overflow may occur only in a region having the smallest frequency variation in the second frequency range FR2, or each of the first and second counter circuits 731 and 733 may have a sufficient number of bits to prevent overflows.

The ADC 530 may include a start/stop controller (e.g., a start/stop control circuit) 740. The start/stop controller 740 may be connected to the N-type RVCO 531 and the P-type RVCO 533. The start/stop controller 740 may control the oscillation operations of the N-type RVCO 531 and the P-type RVCO 533. For example, the start/stop controller 740 may adjust a time interval from a time point at which the N-type RVCO 531 and the P-type RVCO 533 start to oscillate and to a time point at which the N-type RVCO 531 and the P-type RVCO 533 stop oscillating. The start/stop controller 740 may adjust frequency resolution for a first pulse signal and a second pulse signal by adjusting the time interval from the start of oscillation to the end of oscillation.

The following description will be given for the case in which first pulse signals output for a time T have a frequency of 1 Hz and a frequency of 1.0001 Hz. For example, when the frequency of a first pulse signal is 1 Hz, the number of pulses measured for T=10 s is 10 which is the same as the number of pulses measured for T=10 s from a first pulse signal having a frequency of 1.0001 Hz, and thus it may be difficult to distinguish the frequencies. The time interval from the start of oscillation to the end of oscillation of the N-type RVCO 531 and the P-type RVCO 533 may be changed by the start/stop controller 740 from T=10 s to T=10000 s.

During T=10000 s, the number of pulses of a 1-Hz pulse signal is 10000 and the number of pulses of a 1.0001-Hz pulse signal is 10001, and thus the controller 540 may distinguish the 1-Hz pulse signal and the 1.0001-Hz pulse signal with higher resolution. The values of the time interval, the frequency of pulse signals, and the number of pulses which have been described above are for illustrative purposes only and not for purposes of limitation.

The ADC 530 may include a timer 750. The time interval from the start of oscillation to the end of the oscillation may be adjusted using the timer 750. For example, the start/stop controller 740 may transmit a start signal; after a preset period of time elapses thereafter, the timer 750 may transmit a signal indicating that the preset period of time has elapsed to the start/stop controller 740; and then the start/stop controller 740 may stop the oscillation operations of the N-type RVCO 531 and the P-type RVCO 533.

The ADC 530 may include a peak detector (e.g., a peak detection circuit or a peak-hold circuit) 760. The peak detector 760 may be connected to the N-type RVCO 531 and the P-type RVCO 533. The peak detector 760 may detect a peak of a voltage input to the peak detector 760. For example, the peak detector 760 may receive a voltage from the current-voltage conversion circuit 520, detect a peak of the received voltage, and provide the detected peak voltage to the N-type RVCO 531 and the P-type. The N-type RVCO

531 and the P-type RVCO 533 may oscillate at different frequencies depending on the magnitude of the peak voltage.

The voltage output from the current-voltage conversion circuit 520 may vary in magnitude with time, and the peak detector 760 may detect a peak from the waveform of the varying voltage to provide the detected peak voltage to the N-type RVCO 531 and P-type RVCO 533. For example, the peak detector 760 may hold the level of the detected peak voltage and may provide the held level of voltage to the N-type RVCO 531 and the P-type RVCO 533.

The peak detector 760 may detect a voltage exceeding a threshold voltage Vth as a peak voltage and may provide the detected peak voltage to the N-type RVCO 531 and the P-type RVCO 533, and the start/stop controller 740 may control each of the N-type RVCO 531 and the P-type RVCO 533 to start an oscillation operation when a voltage exceeding the threshold voltage Vth is applied.

The N-type RVCO 531 may output a first pulse signal including a plurality of first pulses having different phases from each other. The P-type RVCO 533 may output a second pulse signal including a plurality of second pulses having different phases from each other. The processor 540 may determine a digital signal based on information about the phase of the first pulses and information about the phase of the second pulses.

Figure 8A:
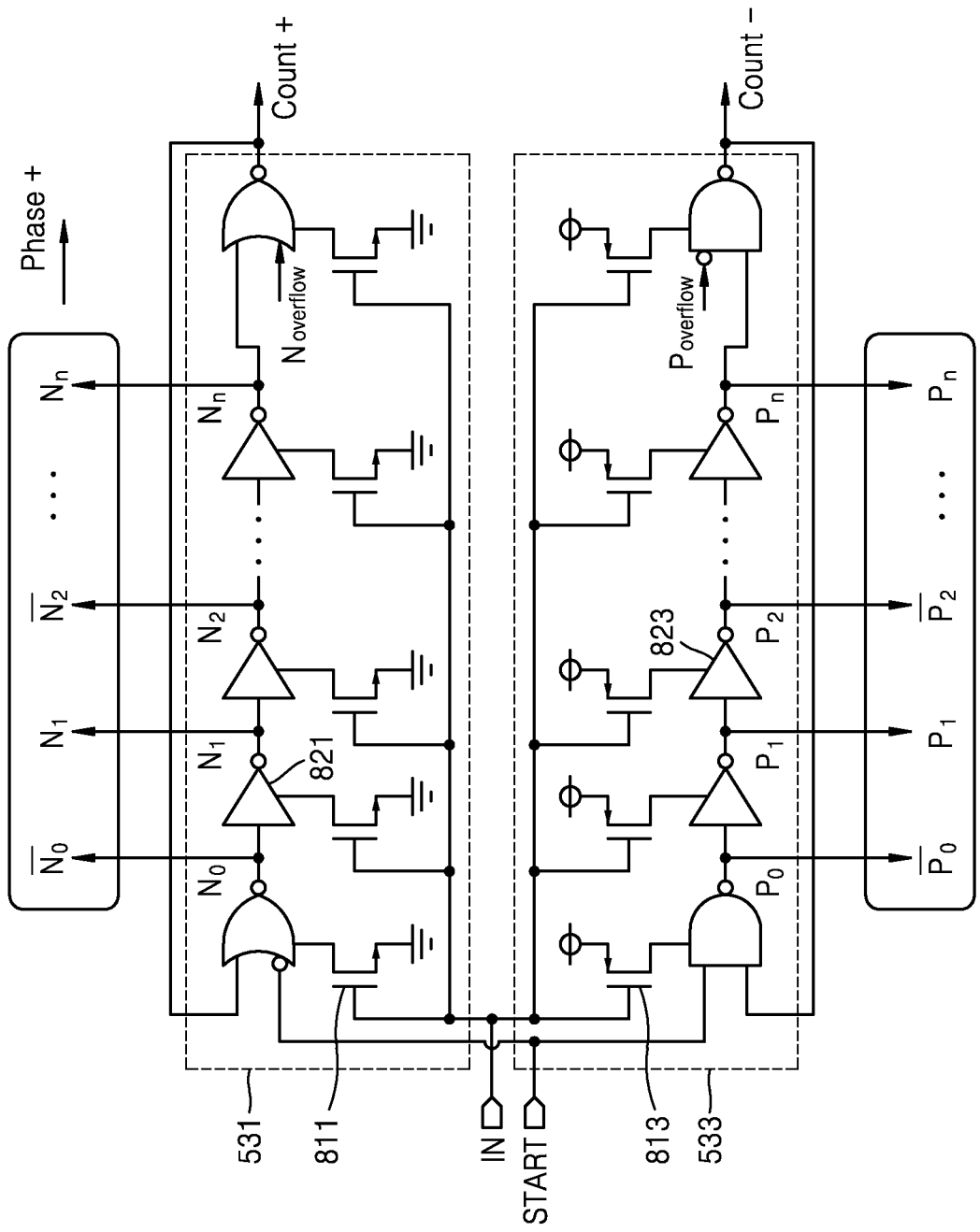
FIG. 8A is an example circuit diagram illustrating an N-type RVCO and a P-type RVCO according to an embodiment.
Figure 8B:
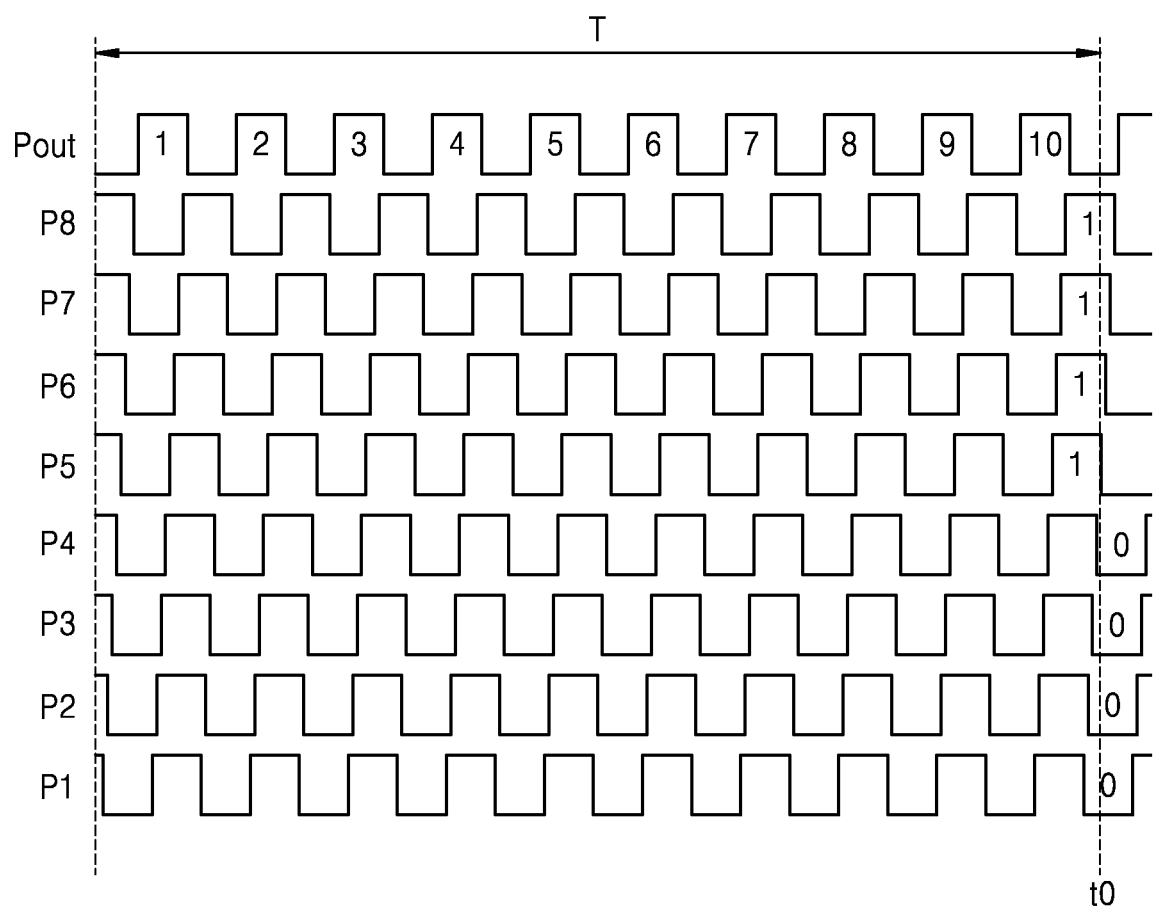
FIG. 8B is a view illustrating a plurality of pulses output from the N-type RVCO and the P-type RVCO shown in FIG. 8A.

FIG. 8A is an example circuit diagram illustrating the N-type RVCO 531 and the P-type RVCO 533 according to an embodiment, and FIG. 8B is a view illustrating a plurality of pulses output from the N-type RVCO 531 and the P-type RVCO 533 shown in FIG. 8A; Referring to FIGS. 8A and 8A, the N-type RVCO 531 may include a plurality of N-channel metal-oxide semiconductors (NMOSs) 811 and a plurality of inverters 821, and the P-type RVCO 533 may include a plurality of P-channel metal-oxide semiconductors (PMOSs) 813 and a plurality of inverters 823.

A plurality of pulses having different phases may be output from ends of the inverters 821 and 823 of the N-type RVCO 531 and the P-type RVCO 533. Signals output from the inverters 821 and 823 may have different phases in the order of the inverters 821 and 823. For example, P1 may refer to a signal output from a first inverter, and P8 may refer to a signal output from a last inverter. P1 to P8 may have different phases because the inverters 821 and 823 have different positions and different delay degrees.

The processor 540 may determine a digital signal by using information on the different phases of the pulses. For example, the processor 540 may obtain phase information on a plurality of first pulses and a plurality of second pulses by acquiring a pattern of the pulse values of the first pulses at a predetermined time point t0 from the N-type RVCO 531, and acquiring a pattern of the pulse values of the second pulses at the predetermined time point from the P-type RVCO 533

For example, P8 may have a pulse value of 1 at a time point t0, P7 may have a pulse value of 1 at the time point t0, P6 may have a pulse value of 1 at the time point t0, P5 may have a pulse value of 1 at the time point t0, P4 may have a pulse value of 0 at the time point t0, P3 may have a pulse value of 0 at the time point t0, P2 may have a pulse value of 0 at the time point t0, and P1 may have a pulse value of 0 at the time point t0. The pattern of the values of pulses may be 11110000 from P8 to P1.

The patterns of eight pulse values may be 00000001, 00000011, 00000111, 00001111, 00011111, 00111111, 01111111, 11111111, 11111110, 11111100, 11111000, 11110000, 11100000, 11000000, 10000000, and 00000000 in order from P8 to P1. The processor 540 may acquire 1111000 as a pattern of pulse values and may determine a digital signal based on phase information corresponding to 11110000 among sixteen patterns of pulse values.

Pout may refer to a signal transmitted by the N-type RVCO 531 and the P-type RVCO 533 to allow the first and second counter circuits 731 and 733 (refer to FIG. 7) to count the number of pulses. For example, the number of pulses of Pout may be counted as 10 for a time T.

FIG. 9 is view illustrating example tables showing a correspondence relationship between inputs and outputs of each of the N-type RVCO 531 and the P-type RVCO 533, according to an embodiment;

Referring to FIG. 9, Table 910 on the left side shows a relationship between a voltage input to the N-type RVCO 531, the frequency of a first pulse signal, and a digital signal corresponding to the frequency of the first pulse signal. Table 920 on the right side shows a relationship between a voltage input to the P-type RVCO 533, the frequency of a second pulse signal, and a digital signal corresponding to the frequency of the second pulse signal.

Referring to Table 910 on the left side, when 0.7 V is input to the N-type RVCO 531, the N-type RVCO 531 may oscillate at a frequency of 25.18 MHz, and the frequency of 25.18 MHz may be determined as a digital signal "10.250." In 10.250, 10 may correspond to the number of counted pulses, and 0.250 may correspond to phase information.

Similarly, when 0.701 V is input to the N-type RVCO 531, the N-type RVCO 531 may oscillate at a frequency of 24.04 MHz, and the frequency of 24.04 MHz may be determined as a digital signal "11.3125." When 0.702 V is input to the N-type RVCO 531, the N-type RVCO 531 may oscillate at a frequency of 22.91 MHz, and the frequency of 22.91 MHz may be determined as a digital signal "11.375." When 0.703 V is input to the N-type RVCO 531, the N-type RVCO 531 may oscillate at a frequency of 21.79 MHz, and the frequency of 21.79 MHz may be determined as a digital signal "12.4375." When 0.704 V is input to the N-type RVCO 531, the N-type RVCO 531 may oscillate at a frequency of 20.69 MHz, and the frequency of 20.69 MHz may be determined as a digital signal "12.5." When 0.705 V is input to the N-type RVCO 531, the N-type RVCO 531 may oscillate at 19.60 MHz, and the frequency of 19.60 MHz may be determined as a digital signal of "13.5."

When the voltage input to the N-type RVCO 531 is varied from 0.7 V to 0.705 V, the number of pulses may vary from 10 to 13 for 500 ns. 0.701 V and 0.702 V result in the same number of pulses, that is, 11, but result in different pieces of phase information, that is, 0.3125 and 0.375, such that 0.701 V and 0.702 V may be distinguished from each other.

Referring to Table 920 on the right side, when 0.7 V is input to the P-type RVCO 533, the P-type RVCO 533 may oscillate at a frequency of 51.94 MHz, and the frequency of 51.94 MHz may be determined as a digital signal "26.1875." In 26.1875, 26 may correspond to the number of counted pulses, and 0.1875 may correspond to phase information.

When 0.701 V is input to the P-type RVCO 533, the P-type RVCO 533 may oscillate at a frequency of 51.89 MHz, and the frequency of 51.89 MHz may be determined as a digital signal "26.125" When 0.702 V is input to the P-type RVCO 533, the P-type RVCO 533 may oscillate at a frequency of 51.85 MHz, and the frequency of 51.85 MHz may be determined as a digital signal "26.125." When 0.703 V is input to the P-type RVCO 533, the P-type RVCO 533 may oscillate at a frequency of 51.80 MHz, and the frequency of 51.80 MHz may be determined as a digital signal "26.125." When 0.704 V is input to the P-type RVCO 533, the P-type RVCO 533 may oscillate at a frequency of 51.76

MHz, and the frequency of 51.76 MHz may be determined as a digital signal "26.0625." When 0.705 V is input to the P-type RVCO 533, the P-type RVCO 533 may oscillate at a frequency of 51.71 MHz, and the frequency of 51.71 MHz may be determined as a digital signal "26.0625" by the processor 540.

When the voltage input to the P-type RVCO 533 is varied from 0.7 V to 0.705 V, the number of pulses for 500 ns may be 26. 0.701 V and 0.702 V result in the same number of pulses, that is, 26, and the same phase information, that is, 0.125, such that it may be difficult to distinguish 0.701 V and 0.702 V from each other by using only the P-type RVCO 533.

For the same voltage of 0.701 V, 14.8125 may be obtained as the difference between 26.125, indicating the number of pulses and the phase information of the P-type RVCO 533, and 11.3125, indicating the number of pulses and the phase information of the N-type RVCO 531. For the same voltage of 0.702 V, 14.75 may be obtained as the difference between 26.125, indicating the number of pulses and the phase information of the P-type RVCO 533, and 11.375, indicating the number of pulses and the phase information of the N-type RVCO 531. The processor 540 may estimate the application of a voltage of 0.701 V by using the determined digital signal "14.8125," and the application of a voltage of 0.702 V by using the determined digital signal "14.75." The above-mentioned values of voltage, frequency, and digital signal are examples selected for illustrative purposes only and not for purposes of limitation.

Figure 10:
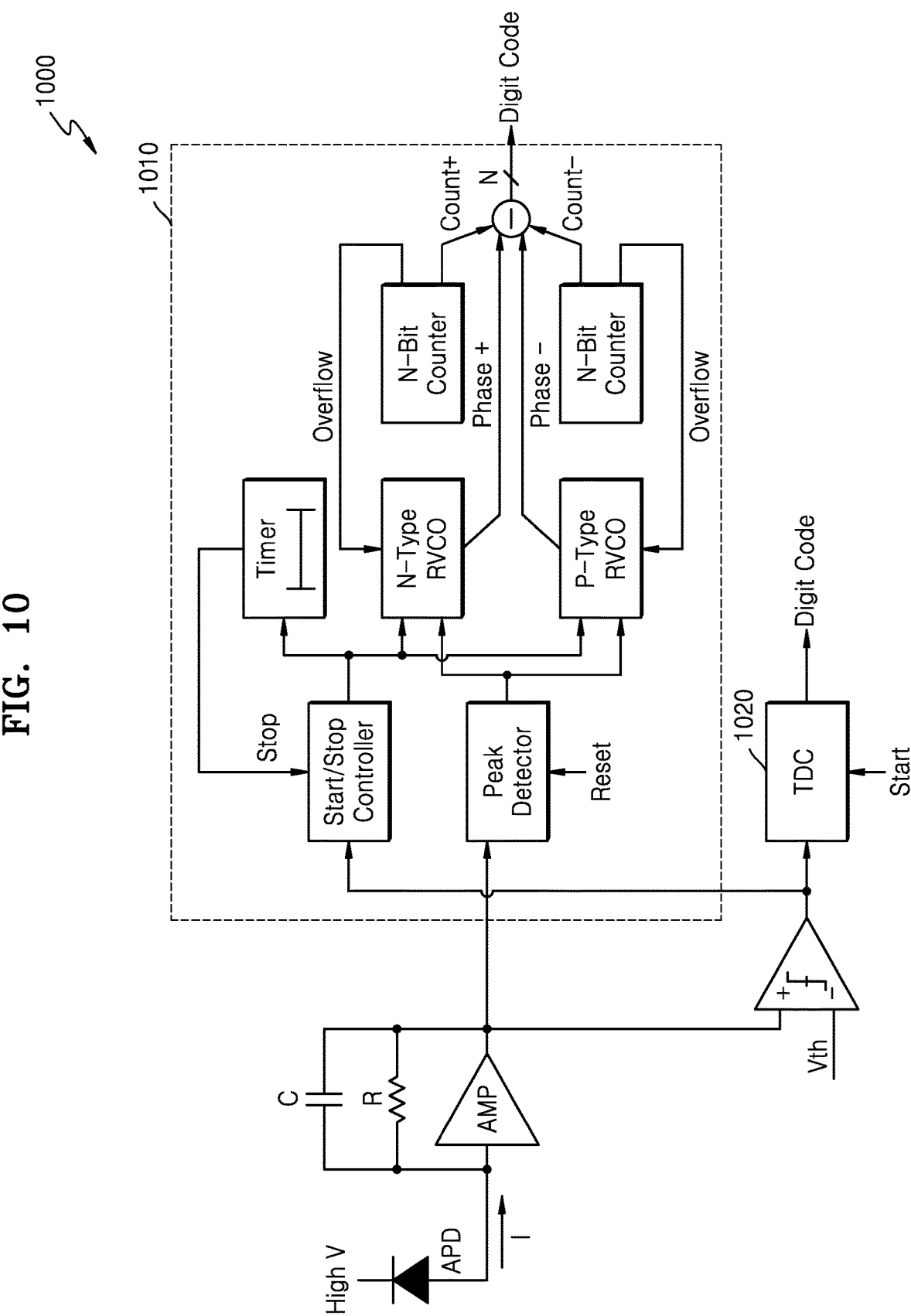
FIG. 10 is a circuit diagram illustrating a LIDAR device including a time-to-digital converter (TDC) according to an embodiment.

FIG. 10 is a circuit diagram illustrating a LIDAR device 1000 including a TDC 1020 according to an embodiment. Referring to FIG. 10, the LIDAR device 1000 may include an ADC 1010 and the TDC 1020. The ADC 1010 shown in FIG. 10 may correspond to the ADC 530 shown in FIGS. 5 and 7.

The TDC 1020 may receive a voltage obtained by converting a current and may measure the ToF of an optical signal. For example, the TDC 1020 may measure the period of time from a time point when the light source unit 110 (refer to FIG. 1) starts to emit light to a time point when the voltage becomes greater than a predetermined threshold (for example, Vth). The processor 540 may analyze the shape, location, etc. of an object OBJ (refer to FIG. 1) based on the measured ToF.

The ADC 1010 may start to perform an oscillation operation from a time point when the voltage obtained by converting a current and input to the ADC 1010 becomes greater than the predetermined threshold (for example, Vth). For example, when a voltage greater than Vth is input, an N-type RVCO (refer to the N-type RVCO 531 shown in FIG. 5) and a P-type RVCO (refer to the P-type RVCO 533 shown in FIG. 5) may oscillate at different frequencies.

Figure 11:
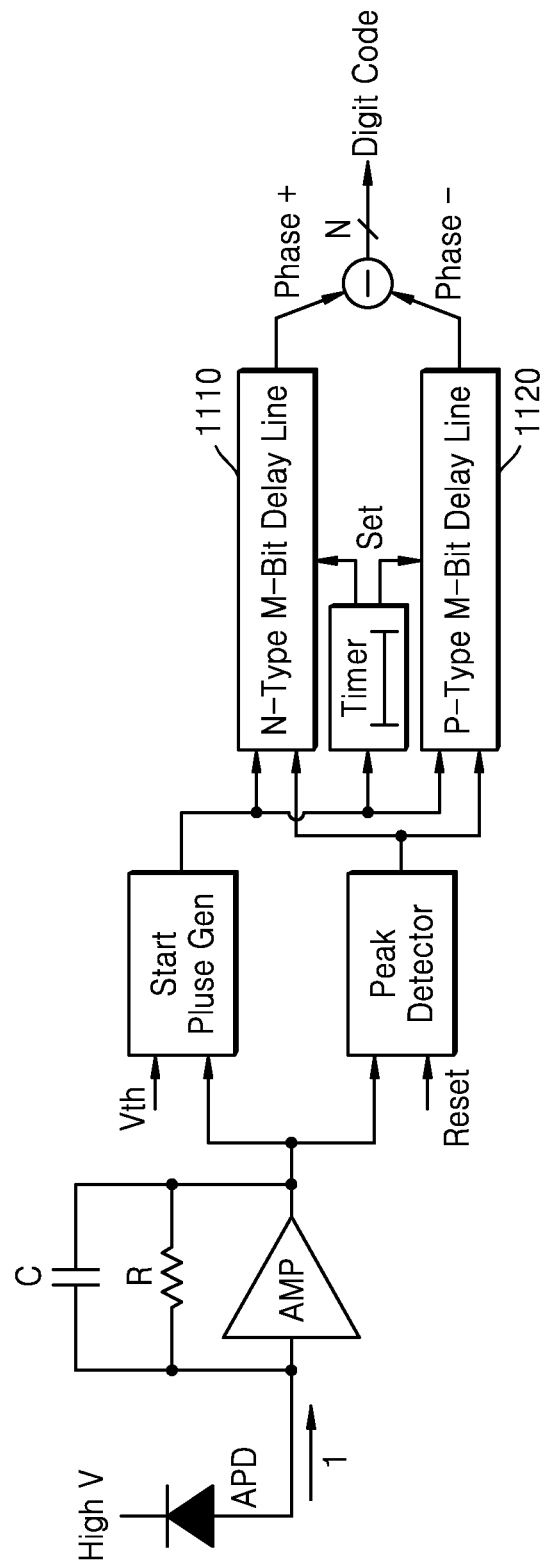
FIG. 11 is a circuit diagram illustrating a LIDAR device according to another embodiment.

FIG. 11 is a circuit diagram illustrating a LIDAR device 1000 according to another embodiment. The LIDAR device 1000 shown in FIG. 11 is different from the LIDAR device 1000 shown in FIG. 7 and the LIDAR device 1000 shown in FIG. 11 in that an N-type delay line 1110 and a P-type delay line 1120 are provided instead of the N-type RVCO 531 and the P-type RVCO 533.

Referring to FIG. 11, the LIDAR device 1000 may include the N-type delay line 1110 and the P-type delay line 1120. The N-type delay line 1110 may output a first delay signal in response to an input voltage. The P-type delay line 1120 may output a second delay signal in response to the input voltage. The processor 540 may estimate the intensity of an optical signal by determining, based on the first delay signal and the second delay signal, a digital signal corresponding to the input voltage. The N-type and P-type delay lines 1110 and 1120 may include a plurality of inverters.

RVCOs (for example, the N-type RVCO 531 and the P-type RVCO 533 shown in FIG. 5) oscillate at constant frequencies in response to an input voltage, whereas the N-type and P-type delay lines 1110 and 1120 may output delay signals having different degrees of delay in response to an input voltage. For example, the N-type delay line 1110 may output a plurality of first delay signals having different phases, the P-type delay line 1120 may output a plurality of second delay signals having different phases, and the processor 540 may determine a digital signal based on information on the phases of the first delay signals and the phases of second delay signals.

Figure 12:
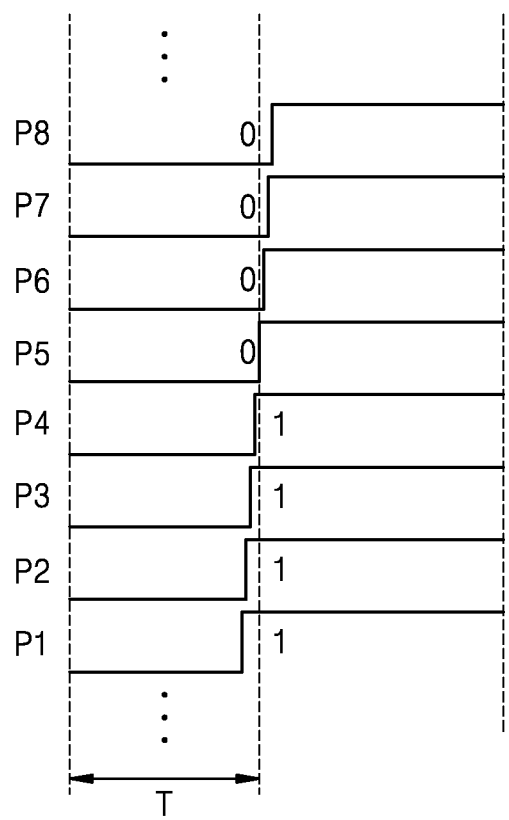
FIG. 12 is a view illustrating a plurality of delay signals according to another embodiment.

FIG. 12 is a view illustrating a plurality of delay signals according to another embodiment. Referring to FIG. 12, a plurality of delay signals having different phases may be output from ends of the inverters of the N-type and P-type delay lines 1110 and 1120. Signals output from the inverters may have different phases in the order of the inverters. For example, P1 may refer to a signal output from a first inverter, and P8 may refer to a signal output from a last inverter. P1 to P8 may have different pieces of phase information because of different positions of the inverters and different degrees of delay.

The processor 540 may determine a digital signal by obtaining different pieces of phase information about the delay signals. For example, the processor 540 may acquire a pattern of the pulse values of a plurality of first delay signals at a predetermined time point from the N-type delay line 1110 and a pattern of the pulse values of a plurality of second delay signals at the predetermined time point from the P-type delay line 1120, and may obtain information on the phases of the first delay signals and the second delay signals based on the acquired patterns.

For example, P8 may have a pulse value of 0 at the last time point of a period of time T, P7 may have a pulse value of 0 at the last time point of the period of time T, P6 may have a pulse value of 0 at the last time point of the period of time T, P5 may have a pulse value of 0 at the last time point of the period of time T, P4 may have a pulse value of 1 at the last time point of the period of time T, P3 may have a pulse value of 1 at the last time point of the period of time T, P2 may have a pulse value of 1 at the last time point of the period of time T, and P1 may have a pulse value of 1 at the last time point of the period of time T. The pattern of the pulse values of the delay signals may be 00001111 from P8 to P1. The processor 540 may obtain 0000111 as a pattern of pulse values and may determine a digital signal based on phase information corresponding to 00001111.

Figure 13:
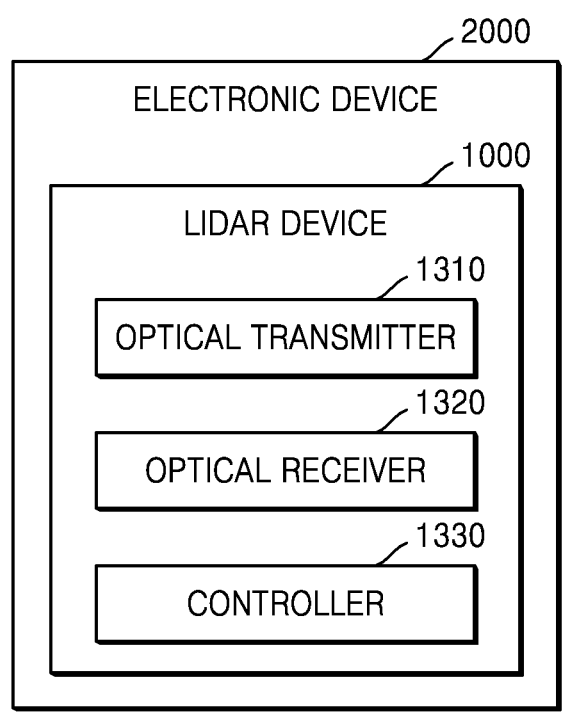
FIG. 13 is a block diagram illustrating an electronic device including a LIDAR device according to an embodiment.

FIG. 13 is a block diagram illustrating an electronic device 2000 including a LIDAR device 1000 according to an embodiment. Referring to FIG. 13, the electronic device 2000 may include the LIDAR device 1000.

The electronic device 2000 may use information on the shape, location, etc. of an object (refer to the object OBJ shown in FIG. 1). For example, the electronic device 2000 may be an unmanned vehicle, a drone, a smartphone, a cellular phone, a PDA, a laptop, a PC, a wearable device, or another mobile or non-mobile computing device.

The LIDAR device 1000 may include an optical transmitter 1310, an optical receiver 1320, and a processor 1330. The optical transmitter 1310 shown in FIG. 13 may correspond to the optical transmitter 100 shown in FIG. 1. The optical receiver 1320 shown in FIG. 13 may correspond to the optical receiver 200 shown in FIG. 1, and may include the photodiode 510, the current-voltage conversion circuit 520, and the ADC 530 which are shown in FIG. 5. The processor 1330 shown in FIG. 13 may correspond to the processor 300 shown in FIG. 1 and the processor 540 shown in FIG. 5.

FIG. 14 is a flowchart illustrating a method of operating a LIDAR device according to an embodiment. Referring to FIG. 14, the method of operating a LIDAR device may include operations which are time-sequentially performed by a LIDAR device (for example, the LIDAR device 1000 described with reference to FIG. 5, the LIDAR device 1000 described with reference to FIG. 7, and the LIDAR device 1000 described with reference to FIG. 10). Therefore, the above-described technical aspects of the LIDAR devices 1000 (for example, described with reference to FIG. 5, FIG. 7, and FIG. 10) may be applied to the method shown in FIG. 14 even though the technical aspects are not described below.

In operation 1410, the photodiode 510 (refer to FIG. 5) may generate a current in response to an input optical signal.

In operation 1420, the current-voltage conversion circuit 520 may convert the current into a voltage.

In operation 1430, the N-type RVCO 531 and the P-type RVCO 533 may output a first pulse signal and a second pulse signal in response to the voltage.

In operation 1440, the processor 540 may estimate the intensity of the optical signal by determining, based on the first pulse signal and the second pulse signal, a digital signal corresponding to the voltage.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light detection and ranging (LIDAR) device comprising:
   a photodiode configured to generate a current based on an optical signal input to the photodiode;
   a current-voltage conversion circuit configured to convert the current into a voltage;
   an N-type ring voltage controlled oscillator (RVCO) configured to output a first pulse signal when the voltage is input to the N-type RVCO;
   a P-type RVCO configured to output a second pulse signal when the voltage is input to the P-type RVCO; and
   a processor configured to estimate an intensity of the optical signal by identifying a digital signal value corresponding to the voltage based on: at least one of a number of pulses of the first pulse signal and a first piece of phase information on the first pulse signal; and at least one of a number of pulses of the second pulse signal and a second piece of phase information on the second pulse signal.

2. The LIDAR device of claim 1, wherein the N-type RVCO and the P-type RVCO are configured to oscillate at frequencies within different frequency ranges when the voltage varies within a given voltage range.

3. The LIDAR device of claim 2, wherein the N-type RVCO is further configured to output the first pulse signal which oscillates at a first frequency within a first frequency range when the voltage has a first voltage value within a first voltage range and oscillates at a second frequency within a second frequency range narrower than the first frequency range when the voltage has a second voltage value within a second voltage range different from the first voltage range, and
   the P-type RVCO is further configured to output the second pulse signal which oscillates at the second frequency within the second frequency range when the voltage has the first voltage value within the first voltage range and oscillates at the first frequency within the first frequency range when the voltage has the second voltage value within the second voltage range.

4. The LIDAR device of claim 1, further comprising:
   a first counter circuit configured to count the number of pulses of the first pulse signal; and
   a second counter circuit configured to count the number of pulses of the second pulse signal,
   wherein the processor is further configured to identify the digital signal value corresponding to the voltage based on the number of pulses of the first pulse signal and the number of pulses of the second pulse signal.

5. The LIDAR device of claim 4, wherein the processor is further configured to identify the digital signal value corresponding to the voltage by calculating a difference between the number of pulses of the first pulse signal and the number of pulses of the second pulse signal.

6. The LIDAR device of claim 4, wherein when the number of pulses of the first pulse signal counted for a preset time period is greater than a threshold number, the first counter circuit is further configured to output a first stop signal for terminating an operation of the N-type RVCO, and
   when the number of pulses of the second pulse signal counted for the preset time period is greater than the threshold number, the second counter circuit is further configured to output a second stop signal for terminating an operation of the P-type RVCO.

7. The LIDAR device of claim 1, wherein the N-type RVCO is configured to output the first pulse signal comprising a plurality of first pulses having different phases from each other,
   the P-type RVCO is configured to output the second pulse signal comprising a plurality of second pulses having different phases from each other, and
   the processor is further configured to identify the digital signal value corresponding to the voltage based on phase information on the plurality of first pulses and phase information on the plurality of second pulses.

8. The LIDAR device of claim 7, wherein the processor is further configured to:

acquire, from the N-type RVCO, a pattern of pulse values of the plurality of first pulses during a predetermined non-zero time period; and acquire, from the P-type RVCO, a pattern of pulse values of the plurality of second pulses during the predetermined non-zero time period.

9. The LIDAR device of claim 1, wherein the LIDAR device comprises an optical receiver comprising a plurality of pixel regions configured to detect the optical signal, and the optical receiver comprises the photodiode, the current-voltage conversion circuit, the N-type RVCO, and the P-type RVCO for each of the plurality of pixel regions.

10. The LIDAR device of claim 1, further comprising a time-to-digital converter (TDC) configured to measure a time of flight of the optical signal based on the voltage.

11. The LIDAR device of claim 1, further comprising a start/stop control circuit connected to the N-type RVCO and the P-type RVCO, wherein the start/stop control circuit is configured to adjust a frequency resolution for the first pulse signal and the second pulse signal by adjusting a time interval from a first time point when the N-type RVCO and the P-type RVCO start to oscillate to a second time point when the N-type RVCO and the P-type RVCO stop oscillating.

12. The LIDAR device of claim 1, further comprising a peak detection circuit connected to the N-type RVCO and the P-type RVCO, wherein the peak detection circuit is configured to detect a peak of the voltage and provide the detected peak of the voltage to the N-type RVCO and the P-type RVCO.

13. An electronic device comprising a light detection and ranging (LIDAR) device, wherein the LIDAR device comprises:

an optical transmitter comprising a light source and configured to irradiate an object with light generated by the light source;

an optical receiver configured to detect an optical signal reflected from the object; and a processor configured to acquire information on the object by controlling the optical transmitter and the optical receiver, wherein the optical receiver comprises:

a photodiode configured to generate a current based on the optical signal input to the photodiode;

a current-voltage conversion circuit configured to convert the current into a voltage;

an N-type ring voltage controlled oscillator (RVCO) configured to output a first pulse signal when the voltage is input to the N-type RVCO, the first pulse signal comprising a plurality of first pulses having different phases from each other; and a P-type RVCO configured to output a second pulse signal when the voltage is input to the P-type RVCO, the second pulse signal comprising a plurality of second pulses having different phases from each other, wherein the processor is further configured to estimate an intensity of the optical signal by identifying a digital signal value corresponding to the voltage based on phase information on the plurality of first pulses and phase information on the plurality of second pulses.

14. The electronic device of claim 13, wherein the LIDAR device further comprises:

a first counter circuit configured to count a number of pulses of the first pulse signal; and a second counter circuit configured to count a number of pulses of the second pulse signal, and wherein the processor is further configured to identify the digital signal value based on the number of pulses of the first pulse signal and the number of pulses of the second pulse signal.

15. A method of operating a light detection and ranging (LIDAR) device, the method comprising:

generating, by a photodiode, a current based on an optical signal input to the photodiode;

converting the current into a voltage;

outputting a first pulse signal and a second pulse signal by an N-type ring voltage controlled oscillator (RVCO) and a P-type RVCO, respectively, to which the voltage is input; and estimating an intensity of the optical signal by identifying a digital signal value corresponding to the voltage based on: at least one of a number of pulses of the first pulse signal and a first piece of phase information on the first pulse signal; and at least one of a number of pulses of the second pulse signal and a second piece of phase information on the second pulse signal.

* * * * *